(12) United States Patent
Yalamarthi et al.

(10) Patent No.: US 11,178,308 B2
(45) Date of Patent: Nov. 16, 2021

(54) SECURE FILE ACCESS

(71) Applicant: Hewlett-Packard Development Company, L.P., Spring, TX (US)

(72) Inventors: Balaji Yalamarthi, Bangalore (IN); Shakti Amarendra, Bangalore (IN); Sharanabasappa, Bangalore (IN); Vasu Agrawal, Bangalore (IN); Anusha Ghali, Bangalore (IN)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/978,582

(22) PCT Filed: Feb. 11, 2019

(86) PCT No.: PCT/US2019/017416
§ 371 (c)(1),
(2) Date: Sep. 4, 2020

(87) PCT Pub. No.: WO2019/199374
PCT Pub. Date: Oct. 17, 2019

(65) Prior Publication Data
US 2021/0021732 A1    Jan. 21, 2021

(30) Foreign Application Priority Data
Apr. 9, 2018 (IN) .............................. 201841013555

(51) Int. Cl.
*H04N 1/44* (2006.01)
*H04N 1/00* (2006.01)

(52) U.S. Cl.
CPC ......... *H04N 1/444* (2013.01); *H04N 1/00209* (2013.01); *H04N 2201/0094* (2013.01)

(58) Field of Classification Search
USPC .............. 358/1.1–3.29, 1.11–1.18; 725/1–33
See application file for complete search history.

(56) References Cited

U.S. PATENT DOCUMENTS

| | | | |
|---|---|---|---|
| 7,792,910 B2 * | 9/2010 | Yamashita ......... | H04N 1/32667 709/206 |
| 7,877,446 B2 | 1/2011 | Tamai et al. | |
| 2002/0112184 A1 | 8/2002 | Hall et al. | |
| 2002/0133555 A1 | 9/2002 | Hall et al. | |
| 2004/0193918 A1 * | 9/2004 | Green ................. | H04L 63/1433 726/22 |
| 2005/0216587 A1 | 9/2005 | John | |
| 2005/0219640 A1 * | 10/2005 | Kasatani ................ | H04L 67/06 358/402 |
| 2007/0011249 A1 | 1/2007 | Bridges et al. | |

(Continued)

*Primary Examiner* — Marcellus J Augustin
(74) *Attorney, Agent, or Firm* — HP Inc. Patent Department

(57) ABSTRACT

Examples disclosed herein relate to receiving a request for a file via a network, determining whether the request for the file is associated with an authorized user for the file, in response to determining that the request for the file is associated with the authorized user for the file, determining whether the request for the file complies with a security policy associated with the network, and in response to determining that the request for the file complies with the security policy associated with the network, providing access to the file to the authorized user.

11 Claims, 3 Drawing Sheets

(56) References Cited

U.S. PATENT DOCUMENTS

| | | | |
|---|---|---|---|
| 2009/0323115 A1 | 12/2009 | Van Bergen et al. | |
| 2010/0157349 A1* | 6/2010 | Hong | H04N 1/32144 |
| | | | 358/1.14 |
| 2012/0047213 A1 | 2/2012 | Hanada | |
| 2015/0229609 A1 | 8/2015 | Chien | |
| 2015/0324235 A1 | 11/2015 | Engholm | |
| 2016/0248795 A1* | 8/2016 | Chien | H04L 63/0245 |
| 2018/0012036 A1* | 1/2018 | Leemet | G06F 21/80 |
| 2019/0306111 A1* | 10/2019 | Tang | H04L 61/1552 |

* cited by examiner

SECURE FILE ACCESS

BACKGROUND

Multi-function devices often combine different components such as a printer, scanner, and copier into a single device. Such devices frequently enable network access to their functions, such as scanning documents to a file that may then be retrieved from other network-connected devices, such as smartphones and computers.

Figure 1:
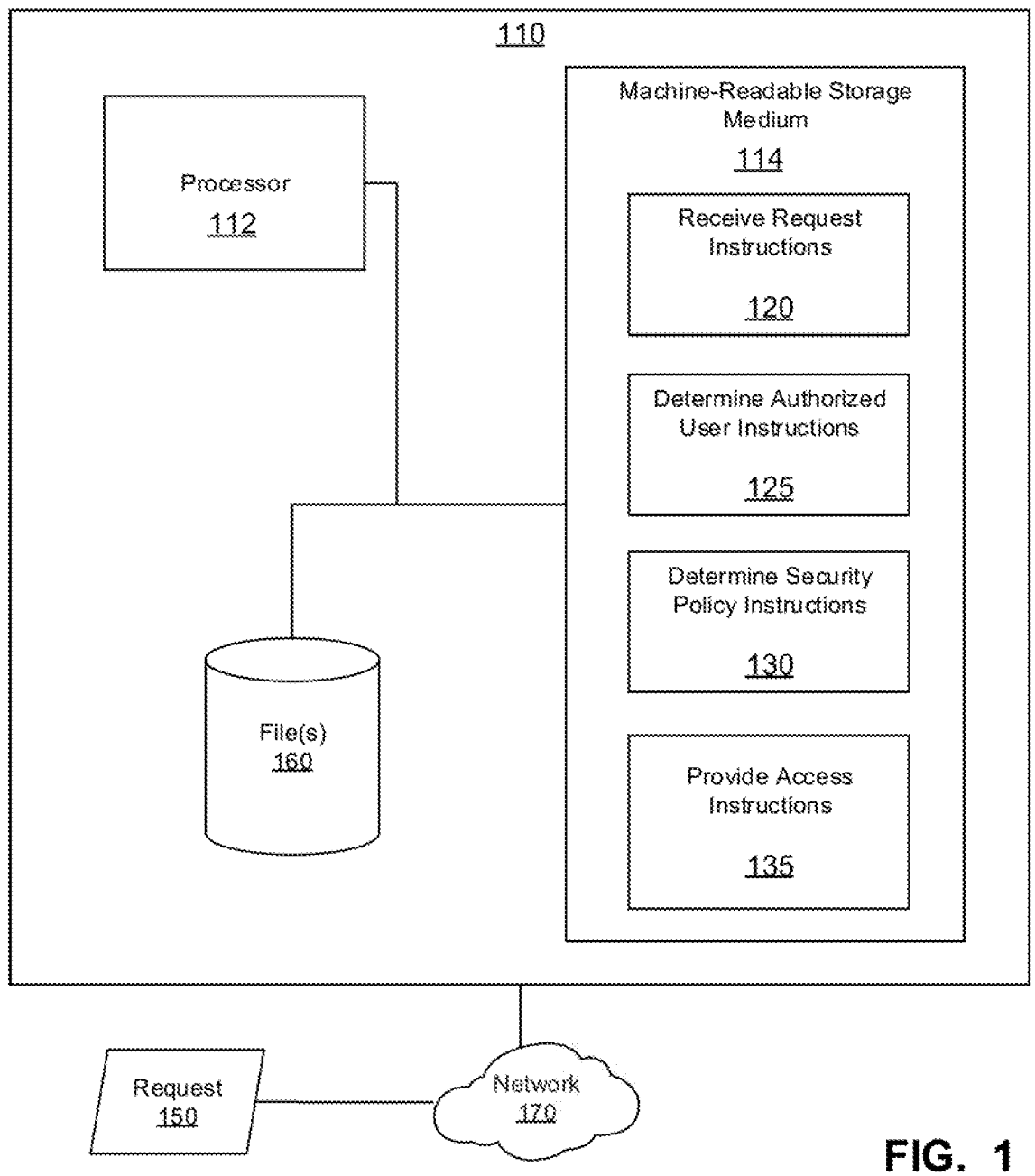
FIG. 1 is a block diagram of an example computing device for providing secure access to a file.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Most multi-function-print devices (MFPs) provide several features, including an option to scan a physical document and send it to a user-specified email address. Other options may include printing, copying, faxing, document assembly, etc. The scanning portion of an MFP may comprise an optical assembly located within a sealed enclosure. The sealed enclosure may have a scan window through which the optical assembly can scan a document, which may be placed on a flatbed and/or delivered by a sheet feeder mechanism.

The optical assembly may capture an image of the document for storage in a digital file format. For example, the optical assembly may comprise a light source and an image sensor. The image sensor may be a linear image sensor or an array of image sensors that spans a width of a document to be scanned. The light source may be a linear light source, such as a florescent tube, an array of light sources, such as a series of light emitting diodes (LEDs), or a light guide with a point light source or sources. The light source may emit light through the scan window onto the medium to be scanned while the image sensor captures light reflected by the medium through the scan window. A lens or array of lenses, such as a rod lens array, may be provided to focus light on the image sensor.

Once captured, the image of the document may be stored in a digital file format such as a portable document format (PDF), a tagged image file format (TIFF), JPEG, etc. Such files may be stored on the MFP and/or in another storage device, such as a network-attached storage, external drive, cloud service, etc. The file may be accessed in numerous ways, such as emailing to a user and/or retrieved by following a web-based link to the file's storage location.

The convenience of scanning to email, however, has an inherent security loophole as a rogue user in an office might scan a confidential document and send it to an outside email address, such as a personal account or a competitor. Further, some MFPs support network-connectivity such that applications may request retrieval of scanned documents from rogue client devices, such as those located outside an enterprise's secure internal network.

Security policies may be put into place to prevent such a rogue user from capturing confidential information. A security policy may be used to examine various criteria around operations to transfer data, such as a file associated with a scanner's output, and determine whether any of those criteria comprise a risk of improper exposure. For example, attempts to transfer a file via email may be examined to determine whether the recipient email address is associated with an approved domain name and/or a specific approved user. For another example, requests to transfer the file may determine whether the request is received from and/or comprises a request to deliver the file to an approved IP address, such as an IP address associated with an approved network. Such approved networks may comprise, for example, specifically delimited subnets and/or networks whose IP addresses resolve to approved domains via a reverse-DNS (Domain Name Service) lookup operation. In some implementations, the operation to transfer the file may only be approved under a security policy if the requestor and/or recipient are associated with an IP address that resolves to the same domain name as an IP address of the MFP that scanned the file.

FIG. 1 is a block diagram of an example computing device 110 for providing secure access to a file. Computing device 110 may comprise a processor 112 and a non-transitory, machine-readable storage medium 114. Storage medium 114 may comprise a plurality of processor-executable instructions, such as receive request instructions 120, determine authorized user instructions 125, determine security policy compliance instructions 130, and provide access instructions 135. In some implementations, instructions 120, 125, 130, 135 may be associated with a single computing device 110 and/or may be communicatively coupled among different computing devices such as via a direct connection, bus, or network.

Processor 112 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 114. In particular, processor 112 may fetch, decode, and execute instructions 120, 125, 130, 135.

Executable instructions 120, 125, 130, 135 may comprise logic stored in any portion and/or component of machine-readable storage medium 114 and executable by processor 112. The machine-readable storage medium 114 may comprise both volatile and/or nonvolatile memory and data storage components. Volatile components are those that do not retain data values upon loss of power. Nonvolatile components are those that retain data upon a loss of power.

The machine-readable storage medium 114 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Receive request instructions 120 may receive a request 150 for a file 160 via a network 170. In some implementations, the request for the file 160 may comprise a request to send the file 160 to an email address. The file 160 may comprise, for example, a scanned document file 160 captured by a printing device connected to the network. In some implementations, a plurality of files 160 may be available, stored locally on device 110 and/or accessible via network 170. Network 170 may comprise any of a number of communication types and protocols, such as ethernet, wireless, radio, cellular, Bluetooth, the Internet, etc. For example, network 170 may comprise an office intranet utilizing wireless communications and/or wired communications. In some implementations, network 170 may represent a direct communication path between a request originating device and device 110, such as a USB cable.

Request 150 may comprise information about the file 160 to be requested, a user associated with making the request 150, and a user associated with receiving the file 160. In some examples, the user making the request 150 may be the same as the user to receive the file 160. In other examples, the user may make the request 150 for the file 160 on behalf of another recipient user.

Determine authorized user instructions 125 may determine whether the request 150 for the file 160 is associated with an authorized user for the file 160. In some implementations, instructions 125 may comprise instructions to determine whether the request 150 is received from a user identifier associated with an authorized domain name. For example, requests for file 160 may only be authorized by users having an email address and/or other identifier associated with a domain name (e.g., "company.com") configured by an administrator of device 110 as authorized. The requesting user may be required to enter their email address and/or other credentials, such as by logging in to device 110 and/or another application that may create the request, so as to provide the domain name.

In some implementations, instructions 125 may comprise instructions to determine whether an email address of a user associated with the request 150 comprises a same domain as an email address associated with the scanned document file 160. For example, the email address may be associated with the scanned document file 160 by the printing device in conjunction with a scan operation to capture the scanned document file 160. The email address associated with the scanned file 160 may therefore be associated with an email address of a user who performed the scan operation. In such an example, instructions 125 may determine whether the email address of the user making the request 150 for the file 160 and the email address of the user responsible for creating the file 160 are associated with the same domain name.

Determine security policy compliance instructions 130 may, in response to determining that the request 150 for the file 160 is associated with the authorized user for the file 160, determine whether the request 150 for the file 160 complies with a security policy associated with the network. In some implementations, instructions 130 may comprise instructions to determine whether the request 150 is received from an approved network address and/or to determine whether the request 150 is associated with a network address sharing a domain name with the network. For example, request 150 may be received from an application connected to network 170, which may comprise an internal corporate network. Instructions 130 may determine that the IP address from which request 150 is received is in the same internal network, such as in the same private subnet, as device 110. In some implementations, instructions 130 may comprise instructions to determine whether an email address in a request 150 to send the file 160 to the email address comprises an authorized domain name.

In some implementations, the instructions to determine whether the request 150 is received from the network address sharing the domain name with the network comprise instructions to perform a reverse lookup on the network address and a reverse lookup on a second network address associated with the file 160. For example, request 150 may come in via the Internet from a public IP address. By performing a reverse-DNS lookup on the public IP address, instructions 130 may determine whether the public IP address is associated with an approved domain name. The IP address may be routed through a reverse Domain Name System (DNS) lookup operation to identify a domain name associated with the IP address using pointer (PTR) records maintained according to the DNS standard. Once the domain name has been identified, instructions 130 may determine whether that domain name, wholly and/or partially, is approved for requesting and/or receiving the file 160. For example, the security policy may require that the reverse domain name at least partially match the domain name associated with a reverse DNS lookup of the IP address associated with device 110. In an example, device 110 may result in a reverse domain name lookup of "printer77.site7.company.com" while the request may be received from an IP address resolving, via reverse lookup, to "user54321.mobileapps.site4.company.com". The security policy may be configured to require only that the "company.com" portion of the domain names match and/or may require that further portions of the domain name match. In this example, the security policy may determine that a request from "*.site4.company.com" is not allowed to request files from a device with a partial domain name of "*.site7.company.com".

Provide access instructions 135 may, in response to determining that the request 150 for the file 160 complies with the security policy associated with the network, provide access to the file 160 to the authorized user. For example, providing access may comprise allowing the user to retrieve the file to another device, such as by email, network transfer, and/or direct connection (e.g., to a USB drive). For another example, providing access may comprise allowing the user to print a copy of the file.

Figure 2:
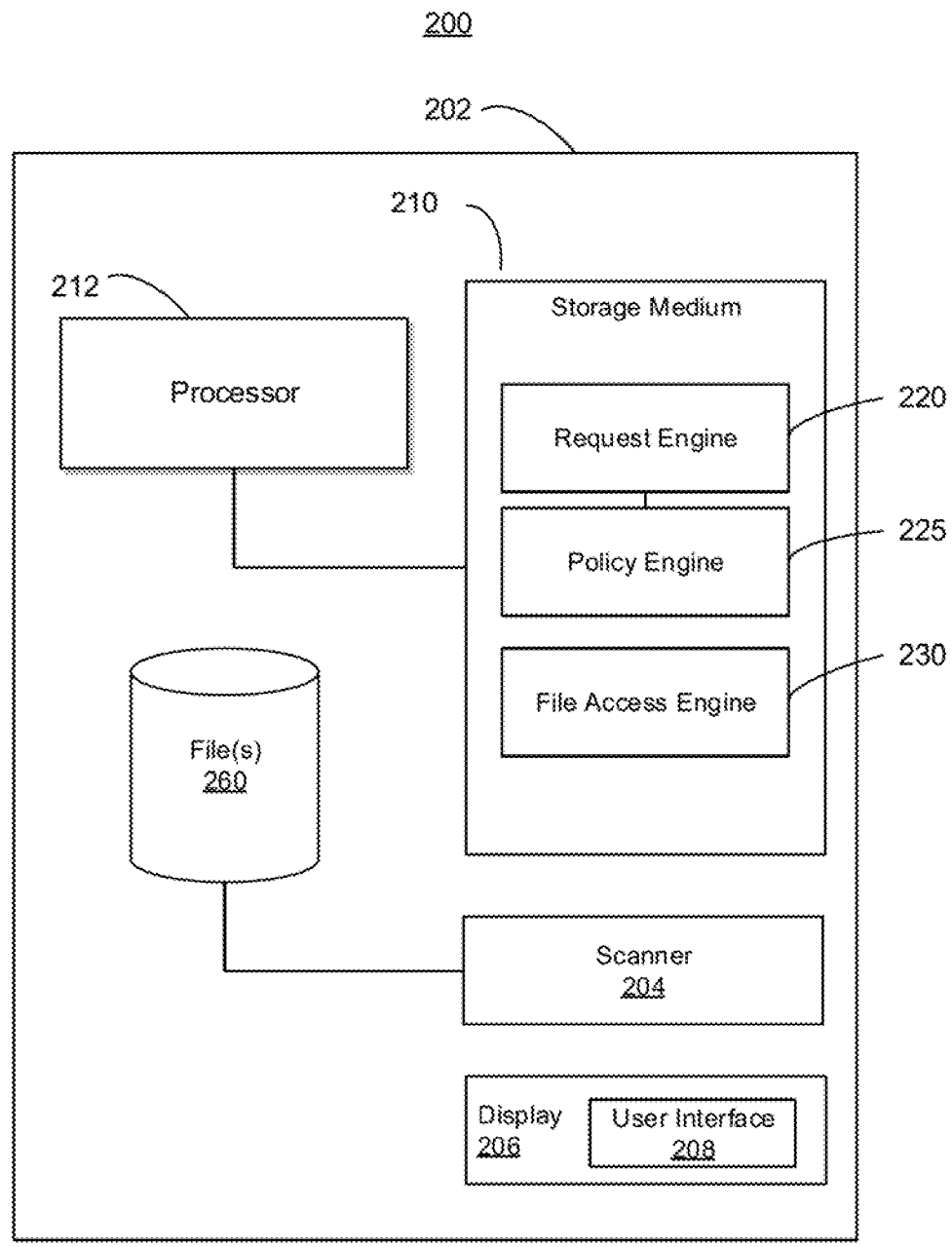
FIG. 2 is a block diagram of an example system for providing secure access to a file.

FIG. 2 is a block diagram of an example apparatus 200 for providing secure access to a file 260. Apparatus 200 may comprise a multi-function printer device 202 comprising a scanner 204, a display 206 to provide a user interface 208, a storage medium 210, and a processor 212. Device 202 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 202 may store, in storage medium 210, a request engine 220, a policy engine 225, and a file access engine 230.

Each of engines 220, 225, 230 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 220, 225, 230. In such examples, device 202 may comprise the machine-readable storage medium storing the instructions and the processing resource to execute the instructions, or the machine-readable storage medium may be separate but accessible to apparatus 200 and the processing resource.

Scanner 204 may capture a digital representation of a document in a file 260. For example, device 202 may comprise a scanner component operable to capture a digital representation of a physical document. Such a scanner component may comprise a camera and/or a sheet-fed, flat-bed, and/or drum scanner. The scanner may, for example use a charge-coupled device (CCD), a photomultiplier tube (PMT), and/or a contact image sensor (CIS) as an image sensor.

Display 206 may provide user interface 208 to receive a recipient email address for the file 260. For example, a control panel may be coupled to device 202 to provide an electronic user interface, such as via a capacitive touch screen. The user interface may allow a user to select options for various operations on device 110 and may comprise an authentication interface that allows the user to enter credentials and/or provide some form of authentication (e.g., RFID tag, biometric scan, etc.). The user may enter a destination email address for file 260 resulting from the scanner operation.

Request engine 220 may receive a request for the file 260. In some implementations, the request for the file 260 may comprise a request to send the file 160 to an email address. The file 260 may comprise, for example, a scanned document file 160 captured by a printing device connected to the network. In some implementations, a plurality of files 260 may be available, stored locally on device 202 and/or accessible via a network.

The request may comprise information about the file 260 to be requested, a user associated with making the request, and a user associated with receiving the file 260. In some examples, the user making the request may be the same as the user to receive the file 260. In other examples, the user may make the request for the file 260 on behalf of another recipient user.

Policy engine 225 may determine whether the request complies with a security policy, wherein the security policy comprises at least one of the following: a valid network address, a valid email address and a valid network domain name. For example, policy engine 260 may execute instructions 125 to determine whether the request for the file 260 is associated with an authorized user for the file 260 and/or determine whether the request for the file 260 complies with a security policy associated with the network.

Determine authorized user instructions 125 may determine whether the request for the file 260 is associated with an authorized user for the file 260. In some implementations, instructions 125 may comprise instructions to determine whether the request is received from a user identifier associated with an authorized domain name. For example, requests for file 260 may only be authorized by users having an email address and/or other identifier associated with a domain name (e.g., "company.com") configured by an administrator of device 202 as authorized. The requesting user may be required to enter their email address and/or other credentials, such as by logging in to device 202 and/or another application that may create the request, so as to provide the domain name.

In some implementations, instructions 125 may comprise instructions to determine whether an email address of a user associated with the request comprises a same domain as an email address associated with the scanned document file 260. For example, the email address may be associated with the scanned document file 260 by the printing device in conjunction with a scan operation to capture the scanned document file 260. The email address associated with the scanned file 160 may therefore be associated with an email address of a user who performed the scan operation. In such an example, instructions 125 may determine whether the email address of the user making the request for the file 260 and the email address of the user responsible for creating the file 260 are associated with the same domain name.

Determine security policy compliance instructions 130 may, in response to determining that the request for the file 260 is associated with the authorized user for the file 260, determine whether the request for the file 260 complies with a security policy associated with the network. In some implementations, instructions 130 may comprise instructions to determine whether the request is received from an approved network address and/or to determine whether the request is associated with a network address sharing a domain name with the network. For example, request may be received from an application connected to a network, which may comprise an internal corporate network. Instructions 130 may determine that the IP address from which request is received is in the same internal network, such as in the same private subnet, as device 110. In some implementations, instructions 130 may comprise instructions to determine whether an email address in a request to send the file 260 to the email address comprises an authorized domain name.

In some implementations, the instructions to determine whether the request is received from the network address sharing the domain name with the network comprise instructions to perform a reverse lookup on the network address and a reverse lookup on a second network address associated with the file 260. For example, request may come in via the Internet from a public IP address. By performing a reverse-DNS lookup on the public IP address, instructions 130 may determine whether the public IP address is associated with an approved domain name. The IP address may be routed through a reverse Domain Name System (DNS) lookup operation to identify a domain name associated with the IP address using pointer (PTR) records maintained according to the DNS standard. Once the domain name has been identified, instructions 130 may determine whether that domain name, wholly and/or partially, is approved for requesting and/or receiving the file 260. For example, the security policy may require that the reverse domain name at least partially match the domain name associated with a reverse DNS lookup of the IP address associated with device 202. In an example, device 202 may result in a reverse domain name lookup of "printer77.site7.company.com" while the request may be received from an IP address resolving, via reverse lookup, to "user54321.mobileapps.site4.company.com". The security policy may be configured to require only that the "company.com" portion of the domain names match and/or may require that further portions of the domain name match. In this example, the security policy may determine that a request from "*.site4.company.com" is not allowed to request files from a device with a partial domain name of "*.site7.company.com".

File access engine 230 may, in response to determining that the request complies with the security policy, provide access to the file 260. For example, providing access may comprise allowing the user to retrieve the file to another device, such as by email, network transfer, and/or direct connection (e.g., to a USB drive). For another example, providing access may comprise allowing the user to print a copy of the file.

Figure 3:
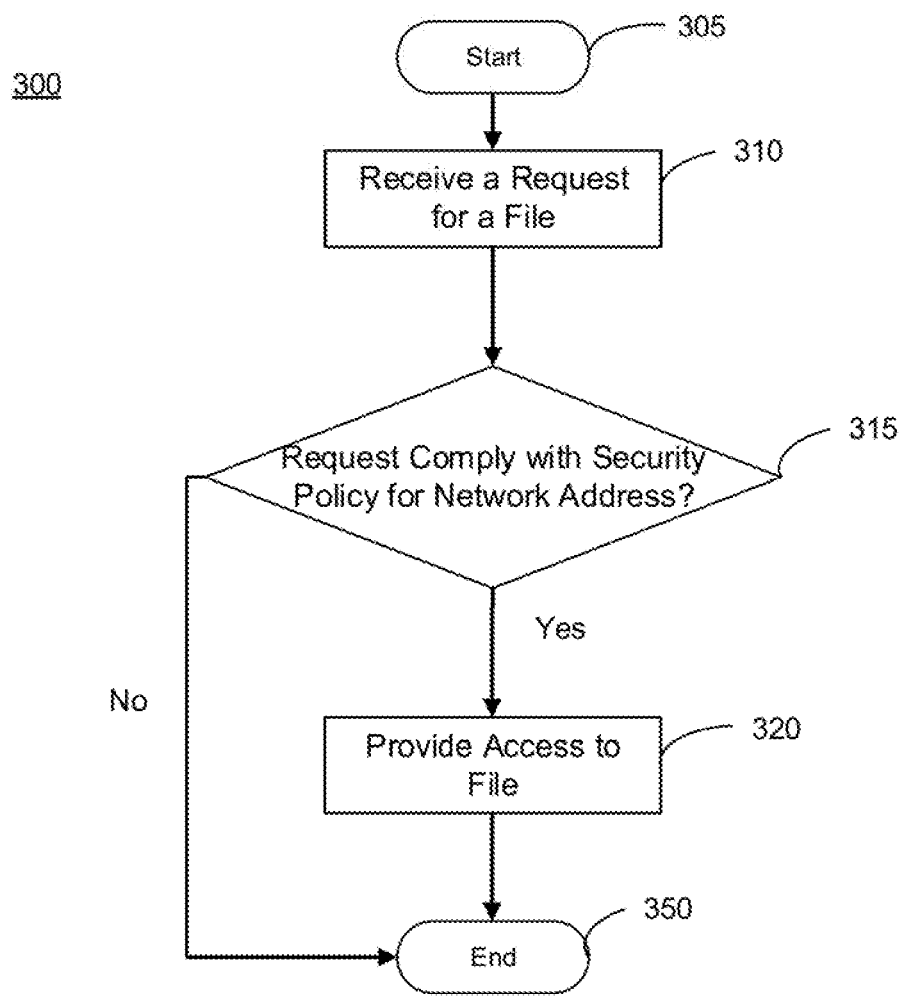
FIG. 3 is a flowchart of an example method for providing secure access to a file.

FIG. 3 is a flowchart of an example method 300 for secure access to a file. Although execution of method 300 is described below with reference to computing device 110, other suitable components for execution of method 300 may be used.

Method 300 may begin at stage 305 and advance to stage 310 where device 110 may receive a request for a file from the user. For example, receive request instructions 120 may receive a request 150 for a file 160 via a network 170. In some implementations, the request for the file 160 may comprise a request to send the file 160 to an email address. The file 160 may comprise, for example, a scanned document file 160 captured by a printing device connected to the network. In some implementations, a plurality of files 160 may be available, stored locally on device 110 and/or accessible via network 170. Network 170 may comprise any of a number of communication types and protocols, such as ethernet, wireless, radio, cellular, Bluetooth, the Internet, etc. For example, network 170 may comprise an office intranet utilizing wireless communications and/or wired communications. In some implementations, network 170 may represent a direct communication path between a request originating device and device 110, such as a USB cable.

Request 150 may comprise information about the file 160 to be requested, a user associated with making the request 150, and a user associated with receiving the file 160. In some examples, the user making the request 150 may be the same as the user to receive the file 160. In other examples, the user may make the request 150 for the file 160 on behalf of another recipient user.

Method 300 may then advance to stage 315 where computing device 110 may determine whether the request from the user complies with a security policy for a network address associated with the request. In some implementations, determining whether the request from the user complies with the security policy for the network address associated with the request comprises determining whether the network address resolves to an approved domain name. For example, the approved domain name may comprise a domain name associated with a scanning device associated with capturing a document to store as the available file. Such a domain-name may be identified, for example, via a reverse-lookup operation on the network address of the scanning device and/or the network address associated with the request.

For example, determine security policy compliance instructions 130 may determine whether the request 150 for the file 160 complies with a security policy associated with the network. In some implementations, instructions 130 may comprise instructions to determine whether the request 150 is received from an approved network address and/or to determine whether the request 150 is associated with a network address sharing a domain name with the network. For example, request 150 may be received from an application connected to network 170, which may comprise an internal corporate network. Instructions 130 may determine that the IP address from which request 150 is received is in the same internal network, such as in the same private subnet, as device 110. In some implementations, instructions 130 may comprise instructions to determine whether an email address in a request 150 to send the file 160 to the email address comprises an authorized domain name.

In some implementations, the instructions to determine whether the request 150 is received from the network address sharing the domain name with the network comprise instructions to perform a reverse lookup on the network address and a reverse lookup on a second network address associated with the file 160. For example, request 150 may come in via the Internet from a public IP address. By performing a reverse-DNS lookup on the public IP address, instructions 130 may determine whether the public IP address is associated with an approved domain name. The IP address may be routed through a reverse Domain Name System (DNS) lookup operation to identify a domain name associated with the IP address using pointer (PTR) records maintained according to the DNS standard. Once the domain name has been identified, instructions 130 may determine whether that domain name, wholly and/or partially, is approved for requesting and/or receiving the file 160. For example, the security policy may require that the reverse domain name at least partially match the domain name associated with a reverse DNS lookup of the IP address associated with device 110. In an example, device 110 may result in a reverse domain name lookup of "printer77.site7.company.com" while the request may be received from an IP address resolving, via reverse lookup, to "user54321.mobileapps.site4.company.com". The security policy may be configured to require only that the "company.com" portion of the domain names match and/or may require that further portions of the domain name match. In this example, the security policy may determine that a request from "*.site4.company.com" is not allowed to request files from a device with a partial domain name of ".site7.company.com".

In response to determining that the request from the user complies with the security policy, method 300 may then advance to stage 320 where computing device 110 may provide access to the file. In some implementations, providing access to the file may comprise emailing the file to the user at an email address comprising the approved domain name. For example, provide access instructions 135 may, in response to determining that the request 150 for the file 160 complies with the security policy associated with the network, provide access to the file 160 to the authorized user. For example, providing access may comprise allowing the user to retrieve the file to another device, such as by email, network transfer, and/or direct connection (e.g., to a USB drive). For another example, providing access may comprise allowing the user to print a copy of the file.

Method 300 may then end at stage 350.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed:

1. A non-transitory machine-readable storage medium having stored thereon machine-readable instructions executable to cause a processor to:

responsive to a scanner capturing a digital representation of a document in a file, receive a request to transmit the file from a sender to a recipient;

determine whether the request complies with a security policy based on just the sender or based on both the sender and the recipient, by:
- resolving an address of the sender to a sender domain name;
- resolving an address of the scanner to a scanner domain name; and
- determining that the request does not comply with the security policy if the sender domain name is different than the scanner domain name;

in response to determining that the request complies with the security policy, sending the file from the sender to the recipient; and in response to determining that the request does not comply with the security policy, refraining from providing the recipient access to the file.

2. The medium of claim 1, wherein the processor is to determine whether the request complies with the security policy based on just the sender by further:
- determining that the request complies with the security policy if the sender domain name is identical to the scanner domain name.

3. The medium of claim 1, wherein processor is to determine whether the request complies with the security policy based on both the sender and the recipient of the file by further:
- resolving an address of the recipient to a recipient domain name;
- determining that the request complies with the security policy if both the sender domain name and the recipient domain name are each identical to the scanner domain name; and
- determining that the request does not comply with the security policy if either or both the sender domain name and the recipient domain name are each different than the scanner domain name.

4. The medium of claim 1, wherein the request comprises a request to send the file by email from the sender to the recipient.

5. The medium of claim 1, wherein the processor is part of a same apparatus as the scanner.

6. A method comprising:
- capturing, by a scanner of an apparatus, a digital representation of a document in a file;
- receiving, by a processor of the apparatus, a request to transmit the file from a sender to a recipient;
- determining, by the processor, whether the request complies with a security policy based on just the sender or based on both the sender and the recipient, comprising:
  - resolving an address of the sender to a sender domain name;
  - resolving an address of the scanner to a scanner domain name; and
  - determining that the request does not comply with the security policy if the sender domain name is different than the scanner domain name;
- in response to determining that the request complies with the security policy, sending, by the processor, the file from the sender to the recipient; and
- in response to determining that the request does not comply with the security policy, refraining, by the processor, from providing the recipient access to the file.

7. The method of claim 6, wherein determining whether the request complies with the security policy based on just the sender further comprises:
- determining that the request complies with the security policy if the sender domain name is identical to the scanner domain name.

8. The method of claim 7, wherein determining whether the request complies with the security policy based on both the sender and the recipient further comprises:
- resolving an address of the recipient to a recipient domain name;
- determining that the request complies with the security policy if both the sender domain name and the recipient domain name are each identical to the scanner domain name; and
- determining that the request does not comply with the security policy if either or both the sender domain name and the recipient domain name are each different than the scanner domain name.

9. An apparatus comprising:
- a scanner configured to capture a digital representation of a document in a file;
- a display to provide a user interface to identify a sender and a recipient of the file;
- a storage medium to store the file; and
- a processor to execute machine-readable instructions to:
  - receive a request from the sender to transmit the file to the recipient,
  - determine whether the request complies with a security policy based on just the sender or based on both the sender and the recipient, by:
    - resolving an address of the sender to a sender domain name;
    - resolving an address of the apparatus to an apparatus domain name; and
    - determining that the request does not comply with the security policy if the sender domain name is different than the apparatus domain name;
  - in response to determining that the request complies with the security policy, send the file from the sender to the recipient,
  - in response to determining that the request does not comply with the security policy, refrain from providing the recipient access to the file.

10. The apparatus of claim 9, wherein the processor is to determine whether the request complies with the security policy based on just the sender of the file by further:
- determining that the request complies with the security policy if the sender domain name is identical to the apparatus domain name.

11. The apparatus of claim 9, wherein the processor is to determine whether the request complies with the security policy based on both the sender and the recipient of the file by further:
- resolving an address of the recipient to a recipient domain name;
- determining that the request complies with the security policy if both the sender domain and the recipient domain are each identical to the apparatus domain name; and
- determining that the request complies with the security policy if either or both of the sender domain and the recipient domain are each different than the apparatus domain name.

* * * * *